(12) United States Patent
Yoo et al.

(10) Patent No.: US 8,490,066 B2
(45) Date of Patent: Jul. 16, 2013

(54) PROFILER FOR OPTIMIZING PROCESSOR ARCHITECTURE AND APPLICATION

(75) Inventors: Dong-Hoon Yoo, Yongin-si (KR);
Soo-Jung Ryu, Yongin-si (KR);
Jeong-Wook Kim, Yongin-si (KR);
Hong-Seok Kim, Yongin-si (KR); Hee Seok Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1545 days.

(21) Appl. No.: 11/730,170

(22) Filed: Mar. 29, 2007

(65) Prior Publication Data

US 2008/0120493 A1    May 22, 2008

(30) Foreign Application Priority Data

Nov. 17, 2006 (KR) .................. 10-2006-0113588

(51) Int. Cl.
*G06F 15/76* (2006.01)
*G06F 9/44* (2006.01)

(52) U.S. Cl.
USPC ............................... 717/130; 712/11; 712/15

(58) Field of Classification Search
USPC ...................... 717/130; 712/11, 15
See application file for complete search history.

(56) References Cited

U.S. PATENT DOCUMENTS

| | | | | |
|---|---|---|---|---|
| 5,361,352 A | * | 11/1994 | Iwasawa et al. | 717/124 |
| 5,581,762 A | * | 12/1996 | Hayashi et al. | 717/144 |
| 5,650,938 A | | 7/1997 | Bootehsaz et al. | |
| 5,870,606 A | * | 2/1999 | Lindsey | 717/128 |
| 6,052,518 A | | 4/2000 | Shigeta et al. | |
| 6,477,683 B1 | * | 11/2002 | Killian et al. | 716/106 |
| 6,834,330 B2 | * | 12/2004 | Yechiel | 711/137 |
| 7,051,193 B2 | * | 5/2006 | Wang et al. | 712/221 |
| 2007/0074173 A1 | * | 3/2007 | Ferren et al. | 717/127 |

FOREIGN PATENT DOCUMENTS

| | | |
|---|---|---|
| JP | 11-330370 A | 11/1999 |
| JP | 2005-172830 A | 6/2005 |
| JP | 2005-216177 A | 8/2005 |
| JP | 2006-505057 A | 2/2006 |
| JP | 2006-164279 JP | 6/2006 |
| KR | 10-2002-066936 A | 8/2002 |
| KR | 1020050015155 A | 2/2005 |
| WO | 0046704 A2 | 8/2000 |
| WO | 2004/042498 A2 | 5/2004 |

\* cited by examiner

*Primary Examiner* — Li B Zhen
*Assistant Examiner* — Hang Pan
(74) *Attorney, Agent, or Firm* — Sughrue Mion, PLLC

(57) ABSTRACT

A profiler which provides information to optimize an application specific architecture processor and a program for the processor is provided. The profiler includes: an architecture analyzer which analyzes an architecture description, and generates architecture analysis information, the architecture description describing an architecture of an application specific architecture processor which comprises a plurality of processing elements; a static analyzer which analyzes program static information that describes static information of a program, and generates static analysis information; a dynamic analyzer which analyzes program dynamic information that describes dynamic information of the program, and generates dynamic analysis information, the dynamic information of the program being generated by simulating the program; and a cross profiling analyzer which generates information for optimizing the application specific architecture processor to implement the program based on at least one of the architecture analysis information, the static analysis information, and the dynamic analysis information.

19 Claims, 23 Drawing Sheets

FIG. 4A

```xml
<?xml version="1.0"?>
<architecture xmlns:xsi=http://www.w3.org/2001/XMLSchema-instance>
<resource>
   <FU name = "fu_0">
      <in name = "src1" width = "32" />  ⎫
      <in name = "src2" width = "32" />  ⎬ 410
      <out name = "dst1" width = "32" /> ⎭
      <op>
         <opgroup name = "arith" />  ⎫
         <opgroup name = "logic" />  ⎬ 420
         <opgroup name = "mul" />    ⎭
      </op>
   </FU>
...
<connection>                                        ⎫
   <connect>                                        ⎪
      <src entity = "fu_0" port = "dst1" />         ⎬ 430
      <dst entity = "vliw_int_rf" port = "in1" />   ⎪
   </connect>                                       ⎭
...
```

FIG. 4B

```
...
<op_section>
    <opgroup name = "control" delay = "1">
        <op name = "mv2sr" />
        <op name = "mvfsr" />                    } 440
        <op name = "halt" />
    </opgroup>
    <opgroup name = "cga" delay = "3">
        <op name = "cga" flags = "jmp" />
    </opgroup>
    <opgroup name = "arith" delay = "1">
        <op name = "mov" />
        <op name = "add" />
        <op name = "add_u" />
        <op name = "sub" />
        <op name = "sub_u />                     } 450
        <op name = "setlo" />
        <op name = "sethi" />
        <op name = "mb" />
    </opgroup>
...
```

FIG. 5

| fu_0 | |
|---|---|
| max. delay | 4 | 501
| area | 0.036521 | 502
| config. bits | 17 | 503
| input ports | |
| name | width |
| pred | 1 |
| src1 | 32 |
| src2 | 32 |
| src3 | 32 |
| output ports | |
| name | width |
| pred_dst1 | 1 |
| pred_dst2 | 1 |
| dst1 | 32 |
| OP groups | |
| arith | |
| logic | |
| shift | |

504: input ports section
505: output ports section
506: OP groups section

FIG. 6

| name | delay (queue delay) | usage | operation groups | | |
|---|---|---|---|---|---|
| | | | placement | | operation |
| control | 1 | 16 | fu_0 fy_1 fy_2 fy_3 fy_4 fy_5 fu_6 fy_7 fy_8 fy_9 fy_10 fu_11 fy_12 fy_13 fy_14 fu_15 | | mv2sr mvfsr halt |
| cga | 3 | 16 | fu_0 fy_1 fy_2 fy_3 fy_4 fy_5 fu_6 fy_7 fy_8 fy_9 fy_10 fu_11 fy_12 fy_13 fy_14 fu_15 | | cga |
| arith | 1 | 16 | fu_0 fy_1 fy_2 fy_3 fy_4 fy_5 fu_6 fy_7 fy_8 fy_9 fy_10 fu_11 fy_12 fy_13 fy_14 fu_15 | | mov add add_u sub sub_u setlo sethi mb |

FIG. 8

```xml
...
...
<func name="mynewfunc" regalloc="true" scheduled="true" stacksetup="true">
    <op id="403" nt="0" opc="add">
        <src id="0" rfname="vliw_int_rf" subtype="i" type="r" value="48"/>
        <src id="1" rfname="vliw_int_rf" subtype="i" type="r" value="38"/>
        <dst id="0" rfname="vliw_int_rf" subtype="i" type="r" value="24"/>
        <sched cycle="6" slot="1"/>
    </op>
    <swploop II="4" MII="4" RecMII="1" ResMII="4" density="8.59375000e-01" id="4" queued_mem="0" stage="6">
        <stop sched_time="19"/>
        <cycle value="0">
            <fu name="fu_0">
                <main id="26" opc="ld_uc">
                    <pred sel="0" type="p"/>
                    <src id="0" sel="0" type="i"/>
                    <src id="1" sel="0" type="i"/>
                </main>
                <extra opc="con12">
                    <pred sel="0" type="p"/>
                </extra>
            </fu>
```

FIG. 9

HalfPelVerNxGT8_d[HalfPelVerNxGT8_d.c]

scheduling info. of functional units scheduling info. of connections

| CB | II | MII | RecMII | ResMII | Stage | Density | CON | CGA | ARI | PHI | LOG | SHI | COM | PRE | MUL | LDM |
|----|----|-----|--------|--------|-------|---------|-----|-----|-----|-----|-----|-----|-----|-----|-----|-----|
| 4 | 4 | 4 | 1 | 4 | 6 | 0.86 | | | 6.2 (7) | | | 1.0 (2) | | 0.2 (1) | 1.0 (2) | 3.2 (4) |

HalfPelVerGT8xGT8_f_avg[HalfPelVerGT8xGT8_f_avg.c]

scheduling info. of functional units scheduling info. of connections

| CB | II | MII | RecMII | ResMII | Stage | Density | CON | CGA | ARI | PHI | LOG | SHI | COM | PRE | MUL | LDM |
|----|----|-----|--------|--------|-------|---------|-----|-----|-----|-----|-----|-----|-----|-----|-----|-----|
| | | | | | | | | | | | | | | | | |

FIG. 10

FU Usage for 'HalfPelVerNxGT8-d'

HalfPelVerNxGT8_d(HalfPelVerNxGT8_d.SCHI)

cb 4 (II=4, MII=4, RecII=1, ResII=4, Stage=6, Densily=0.86)

| Cycle | fu_0 | fu_1 | fu_2 | fu_3 | fu_4 | fu_5 | fu_6 | fu_7 | fu_8 | fu_9 | fu_10 | fu_11 | fu_12 | fu_13 | fu_14 | fu_15 | CON | CGA | ARI |
|---|---|---|---|---|---|---|---|---|---|---|---|---|---|---|---|---|---|---|---|
| 0 | ld_uc (con12) | ld_uc (con12) | add (con12) | ld_uc (con12) | add (con12) | intr10_gp (con12) | intr10_gp (con12) | intr16_gp (con12) | mul (con12) | mov (con12) | ld_uc (con12) | lsl (con12) | add (con12) | add (con12) | add (con12) | add (con12) | | | 7 |
| 1 | ld_uc (con12) | ld_uc (con12) | add (con12) | pred_lt start_ctrl | intr10_gp (con12) | lsl (con12) | sub (con12) | intr10_gp (con12) | con12 | st_c (con12) | ld_uc (con12) | add (con12) | add (con12) | add (con12) | add (con12) | mul (con12) | | | 6 |
| 2 | ld_uc (con12) | ld_uc intr16_gp (con12) | | st_c (con12) | mov (con12) | sub (con12) | mov (con12) | mov (con12) | lsl (con12) | st_c (con12) | st_c (con12) | lsl (con12) | add (con12) | con12 | intr16_gp (con12) | con12 | | | 5 |

FIG. 11

| connections |||||
|---|---|---|---|---|
| cycle 0 |||||
| FU fu_0 |||||
| main || pred_gt | swap | 0 |
| port | sel | connection | source | type |
| pred | 7 | wire (width:1) | loop_start / dst | predicate |
| src2 | 0 | wire (width:32) | vliw_int_rf / out2 | integer |
| src1 | 0 | wire (width:32) | vliw_int_rf / out2 | integer |
| extra || start_ctrl |||
| port | sel | connection | source | type |
| pred | 7 | wire (width:1) | loop_start / dst | predicate |
| FU fu_1 |||||
| main || mov | swap | 1 |
| port | sel | connection | source | type |
| src1 | 0 | wire (width:32) | wire (width:32) | integer |

FIG. 13

```xml
<?xml version="1.0"?>
<statistics version="3.0" conf_cycle = '0' >
...
<file name = 'HalfPelVerNxGT8_d.DRE' >
  <func name = 'HalfPelVerNxGT8_d' hit = '795' spill = '0'>
    <cb id='1' swpable='0' mapped='0' cycle='14310' hit='795' iter='0' read='1590' write='23850' ins='34980'
valid_ins='34185' routing_ins='0' exit='1' load='0' store='0' >
    </cb>
    <cb id='2' swpable='0' mapped='0' cycle='3180' hit='795' iter='0' read='0' write='0' ins='4770'
valid_ins='3180' routing_ins='0' exit='2' load='0' store='0' >
    </cb>
    <cb id='11' swpable='0' mapped='0' cycle='22260' hit='795' iter='0' read='0' write='0' ins='85065'
valid_ins='85065' routing_ins='0' exit='1' load='0' store='0' >
    </cb>
    <cb id='3' swpable='0' mapped='0' cycle='11216' hit='2804' iter='0' read='0' write='0' ins='11216'
valid_ins='5608' routing_ins='0' exit='2' load='0' store='0' >
    </cb>
    ...
```

| extended | |
|---|---|
| total static utilization | total dynamic utilization |
| 244 | 7,043,917 |
| operation utilization | | static operation utilization intr00_gp 17
intr02_gp 10
intr04_gp 18
intr05_gp 10
intr06_gp 4
intr07_gp 19
intr10_gp 21
intr13_gp 3
intr16_gp 63
intr29_gp 79 dynamic operagion utilization

- intr00_gp: 168,958
- intr02_gp: 68,399
- intr04_gp: 1,286,778
- intr05_gp: 1,043,778
- intr06_gp: 1,043,295
- intr07_gp: 1,325,849
- intr10_gp: 919,328
- intr13_gp: 134,710
- intr16_gp: 910,170
- intr29_gp: 142,652

| extended ||
|---|---|
| average utilization per cycle | maximum utilization per cycle |
| 1.9 | 7 |
| total static usage | total dynamic utilization |
| 465 | 26,114,389 |
| PE utilization || static PE utilization

FIG. 16A

| fu_0 | | | | | | |
|---|---|---|---|---|---|---|
| input ports | | | | | | |
| name | width | | | | | |
| pred | 1 | | | | | |
| src1 | 32 | | | | | |
| src2 | 32 | | | | | |
| src3 | 32 | | | | | |
| output ports | | | | | | |
| name | width | | | | | |
| pred_dst1 | 1 | | | | | |
| pred_dst2 | 1 | | | | | |
| dst1 | 32 | | | | | |
| input connections | | | | | | |
| port | sel | connection | source | static occurrence | dynamic occurrence | rank |
| pred | 1 | wire (width:1) | vliw_pred / out1 | 429 | 15,225,190 | 3/645 |
| pred | 2 | wire (width:1) | pred_col_bus0 / dst | 74 | 1,566,774 | 278/645 |
| pred | 3 | wire (width:1) | pred_row_bus0 / dst | 37 | 1,676,305 | 258/645 |
| pred | 4 | wire (width:1) | outpred1_4 / dst | 1 | 114,744 | 516/645 |
| pred | 5 | wire (width:1) | outpred2_1 / dst | 48 | 1,212,948 | 357/645 |
| pred | 6 | wire (width:1) | outpred1_8 / dst | 8 | 96,374 | 521/645 |
| pred | 7 | wire (width:1) | outpred2_2 / dst | 14 | 598,416 | 460/645 |
| pred | 8 | wire (width:1) | loop_start / dst | 58 | 979,478 | 401/645 |
| src1 | 0 | wire (width:32) | vliw_int_rf / out1 | 217 | 5,995,789 | 28/645 |
| src1 | 1 | wire (width:32) | outireg1_4 / dst | 25 | 641,252 | 453/645 |
| src1 | 2 | wire (width:32) | outireg1_8 / dst | 30 | 1,549,727 | 284/645 |

FIG. 17A

| no. | w.(%). | acc.w.(%). | cycle | s.cycle | m.cycle | ipc | spill | |
|---|---|---|---|---|---|---|---|---|
| 0 | 11.81 | 11.81 | 3.2M | 82.8K | 0 | 1.41 | 827 | SsbSipVideoH264BpDecoderMainMBDec |
| 1 | 10.76 | 22.57 | 2.9M | 276.0K | 477.0K | 3.33 | 0 | SsvH264BpEntropyDecMacroblockDate |
| 2 | 9.55 | 32.12 | 2.6M | 0 | 1.1M | 6.71 | 136 | SsvH264BpPredictionInversePrediction |
| 3 | 7.18 | 39.3 | 1.9M | 314.5K | 0 | 1.5 | 135 | LumaACCoeffParsingMB |
| 4 | 4.93 | 44.23 | 1.3M | 0 | 0 | 2.03 | 0 | InterDataFetchDMA |
| 5 | 3.45 | 47.68 | 932.5K | 0 | 764.2K | 13.11 | 0 | StaticH264BpFilter_LumaEdge_Horizontal |
| 6 | 3.43 | 51.11 | 926.9K | 0 | 771.2K | 12.59 | 0 | StaticH264BpFilter_LumaEdge_Vertical |
| 7 | 2.73 | 53.84 | 738.9K | 0 | 519.1K | 9.98 | 9 | HalfPelVerNxGT8_h |
| 8 | 2.62 | 56.46 | 710.0K | 0 | 538.4K | 9.86 | 0 | HalfPelHorGT8xN_b_avg |
| 9 | 1.95 | 58.41 | 527.8K | 0 | 391.2K | 11.13 | 0 | HalfPelHorGT8xN_a |

FIG. 17B

| no. | rank | w.(%) | acc.w.(%) | cycle | hit | ipc | ii | rec | res | factor | sc | util | id | function name |
|---|---|---|---|---|---|---|---|---|---|---|---|---|---|---|
| 0 | 0 | 3 | 3 | 859.2K | 5508 | 15 | 8 | 1 | 8 | 2.0 | 4 | 85 | 51 | SsvH264BpPredictionInversePrediction |
| 1 | 1 | 2 | 6 | 771.2K | 7415 | 14 | 5 | 1 | 5 | 1.2 | 5 | 86 | 3 | StaticH264BpFilter_LumaEdge_Vertical |
| 2 | 2 | 2 | 8 | 764.2K | 7011 | 15 | 5 | 1 | 5 | 6.0 | 6 | 88 | 3 | StaticH264BpFilter_LumaEdge_Horizontal |
| 3 | 3 | 1 | 10 | 538.4K | 3799 | 12 | 9 | 1 | 7 | 1.2 | 3 | 73 | 4 | HalfPelHorGT8xN_b_avg |
| 4 | 4 | 1 | 12 | 519.1K | 4467 | 13 | 7 | 1 | 6 | 1.4 | 3 | 78 | 4 | HalfPelVerNxGT8_h |
| 5 | 5 | 1 | 14 | 477.0K | 9000 | 10 | 2 | 1 | 2 | 2.0 | 3 | 31 | 3 | SsvH264BpEntropyDecMacroblockData |
| 6 | 6 | 1 | 16 | 421.1K | 4896 | 12 | 4 | 1 | 3 | 1.1 | 6 | 73 | 3 | StaticH264BpFilter_ChromaEdge_Vertical |
| 7 | 7 | 1 | 17 | 395.4K | 4493 | 13 | 4 | 1 | 3 | 1.1 | 7 | 75 | 3 | StaticH264BpFilter_ChromaEdge_Horizontal |
| 8 | 8 | 1 | 19 | 391.2K | 2956 | 14 | 8 | 1 | 7 | 1.3 | 3 | 82 | 4 | HalfPelHorGT8xN_a |
| 9 | 12 | 0 | 19 | 236.3K | 1890 | 6 | 7 | 1 | 7 | 2.0 | 2 | 32 | 7 | SsvH264BpPredictionInversePrediction |
| 10 | 14 | 0 | 20 | 215.2K | 2804 | 14 | 4 | 1 | 4 | 1.3 | 6 | 85 | 4 | HalfPelVerNxGT8_d |
| 11 | 19 | 0 | 21 | 176.6K | 7065 | 11 | 3 | 1 | 3 | 1.3 | 5 | 60 | 3 | MCAdd4x4 |

PROFILER FOR OPTIMIZING PROCESSOR ARCHITECTURE AND APPLICATION

CROSS-REFERENCE TO RELATED APPLICATIONS

This application claims priority from Korean Patent Application No. 10-2006-0113588, filed on Nov. 17, 2006, in the Korean Intellectual Property Office, the entire disclosure of which is incorporated herein by reference.

BACKGROUND OF THE INVENTION

1. Field of the Invention

Methods and apparatuses consistent with the present invention relate to an application specific architecture processor, and more particularly, to a profiler for the application specific architecture processor.

2. Description of Related Art

An application specific architecture processor is known for high performance and flexibility in comparison to an application specific integrated circuit (ASIC) and a digital signal processor (DSP). Examples of the application specific architecture processor include a reconfigurable processor, an application specific instruction set processor (ASIP), a very long instruction word (VLIW) architecture, and the like. The application specific architecture processor generally includes a plurality of homogenous processing elements or a plurality of heterogeneous processing elements. As the application specific architecture processor may be readily transformed and released according to a user's demand, the application specific architecture processor is different from a related art processor.

A related art profiler is generally used to optimize a program for a related art processor in a fixed structure. For example, a profiler, such as ARM RealView Series, Intel Thread Tools, and the like, provides only run-time information to optimize software in a target processor in the fixed structure.

However, due to appearance of the application specific architecture processor where a processor structure is transformable by a user, a profiler capable of providing information required to optimize both the application specific architecture processor and a program is required.

SUMMARY OF THE INVENTION

The present invention provides a profiler which provides information required to optimize a program in a target processor and also provides information required to optimize the program and an application specific architecture processor by considering both the program and the application specific architecture processor.

The present invention also provides a profiler which provides static/dynamic operation utilization information, static/dynamic processor element (PE) utilization information, static/dynamic operation schedule information of a program, and the like, which are required to optimize an application specific architecture processor.

According to an aspect of the present invention, there is provided a profiler including: an architecture analyzer which analyzes an architecture description, and generates architecture analysis information, the architecture description describing an architecture of an application specific architecture processor which comprises a plurality of processing elements; a static analyzer which analyzes program static information that describes static information of a program to be implemented by the application specific architecture processor, and generates static analysis information; a dynamic analyzer which analyzes program dynamic information that describes dynamic information of the program, and generates dynamic analysis information, the dynamic information of the program being generated by simulating the program; and a cross profiling analyzer which generates information for optimizing at least one of the application specific architecture processor and the program based on at least one of the architecture analysis information, the static analysis information, and the dynamic analysis information.

According to another aspect of the present invention, the profiler further includes a profile report generator which visually depicts the information for optimizing the application specific architecture processor, which is generated by the cross profiling analyzer, and provides the visually depicted information.

According to still another aspect of the present invention, the architecture analyzer includes: an operation analyzer which analyzes the architecture description and generates operation group information for at least one of the plurality of processing elements capable of performing at least one of a plurality of operation groups; a processing unit analyzer which analyzes the architecture description and generates at least one of input port information for at least one of the plurality of processing elements, output port information for at least one of the plurality of processing elements, and information about at least one operation group for the at least one of the plurality of processing elements; and an interconnection analyzer which analyzes the architecture description and generates information about interconnection of the plurality of processing elements.

According to yet another aspect of the present invention, the static analyzer includes: an operation schedule analyzer which analyzes the program static information and generates information about a schedule of at least one operation, which is performed in at least one of the plurality of processing elements, for each cycle; and a placement and routing analyzer which analyzes the program static information and generates information about to which processing element, among the plurality of processing elements, at least one operation for performing the program is allocated.

According to another aspect of the present invention, the cross profiling analyzer generates: static operation utilization information about a number of times that at least one operation group is used for the program; dynamic operation utilization information about a number of times that at least one operation group is used while the program is being simulated; generates dynamic processing element utilization information about a number of times that at least one of the plurality of processing elements is allocated to at least one operation group which is used while the program is being simulated; dynamic interconnection utilization information about a number of times that interconnection of at least one of the plurality of processing elements is used while the program is being simulated; and information about a loop, among loops of the program, which can be software pipelined.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which:

FIGS. 4A and 4B illustrate an example of an architecture description according to an exemplary embodiment of the present invention;

FIG. 5 illustrates an example of processing unit information analyzed by an architecture analyzer of a profiler according to an exemplary embodiment of the present invention;

FIG. 6 illustrates an example of operation group information analyzed by an architecture analyzer of a profiler according to an exemplary embodiment of the present invention;

FIG. 8 illustrates an example of program static information according to an exemplary embodiment of the present invention;

FIGS. 9 and 10 illustrate an example of operation schedule information generated by a static analyzer of a profiler according to an exemplary embodiment of the present invention;

FIG. 11 illustrates an example of interconnection schedule information and data flow information generated by a static analyzer of a profiler according to an exemplary embodiment of the present invention;

FIG. 13 illustrates an example of program dynamic information according to an exemplary embodiment of the present invention;

FIGS. 16A, 16B, and 16C illustrate static/dynamic interconnection utilization information and interconnection information generated by a profiler according to an exemplary embodiment of the present invention; and FIGS. 17A and 17B illustrate software pipelined loop information generated by a profiler according to an exemplary embodiment of the present invention;

DETAILED DESCRIPTION OF EXEMPLARY EMBODIMENTS OF THE INVENTION

Figure 1:
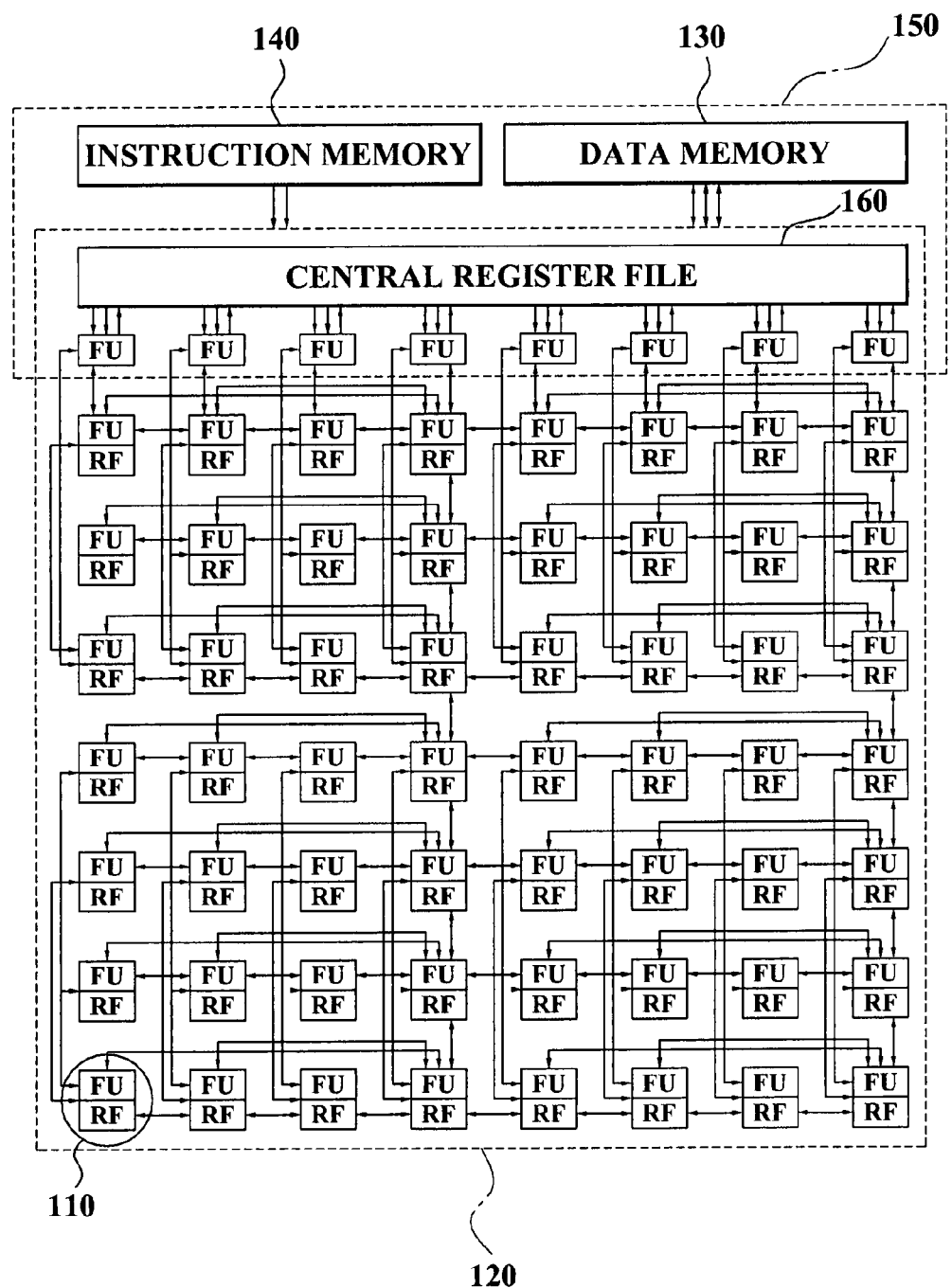
FIG. 1 is a diagram illustrating an example of an application specific architecture processor for describing a profiler according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a diagram illustrating an example of an application specific architecture processor for describing a profiler according to an exemplary embodiment of the present invention.

The application specific architecture processor shown in FIG. 1 corresponds to a reconfigurable processor. The reconfigurable processor may be customized to solve any problem after device fabrication. Also, the reconfigurable architecture may utilize a large amount of spatially customized computational elements to perform computation.

A coarse-grained array 120 includes a plurality of processing elements 110. In this instance, a single processing element 10 includes a functional unit FU and a register file RF. The functional unit performs computation. The register file corresponds to a group of registers and temporarily stores data which is utilized in the functional unit. A configuration memory (not shown) stores information about a configuration of the coarse-grained array 120. The coarse-grained array 120 changes connection status between the plurality of processing elements 110 according to the stored configuration.

A processor shown in FIG. 1 utilizes a portion of the plurality of processing elements 110 of the coarse-grained array 120 as a host processor. Therefore, general instructions are performed in the portion of the plurality of processing elements 110 (hereinafter, "shared processing elements"). Other instructions required to be repeatedly performed, such as a loop, are performed in the entire coarse-grained array 120 which includes the shared processing elements. In this instance, a configuration of utilizing the portion of the plurality of processing elements 110 as the host processor may be called a tightly-coupled configuration. The tightly-coupled configuration includes two modes, an array mode and an instruction set processor mode. In the array mode, functional units of the coarse-grained array 120 are activated according to the stored configuration in the configuration memory. Therefore, the shared processing elements function as a portion of the coarse-grained array 120 in the array mode. Also, in the instruction set processor mode, predetermined functional units, i.e. the shared processing elements, among the functional units of the coarse-grained array 120 are activated. For example, in the instruction set processor mode, only the shared processing elements of the coarse-grained array 120 are activated and remaining processing elements are inactivated.

When utilizing the tightly-coupled configuration, a portion of the plurality of processing elements 110, which are included in the coarse-grained array 120, are utilized as the host processor and thus another host processor is not required. Accordingly, the size of the processor may be reduced and manufacturing costs of the processor may be also reduced.

Also, when utilizing the portion of the plurality of processing elements 110 of the coarse-grained array 120 as the host processor, a very long instruction word (VLIW) architecture 150 may be utilized. In this instance, the VLIW architecture 150 includes a data memory 130, an instruction memory 140, a central register file 160, and the shared processing elements. The data memory 130 is positioned externally from the coarse-grained array 120 to store data, and the instruction memory 140 stores instructions.

In the present exemplary embodiment, an example of an application specific architecture processor has been described based on a tightly-coupled configuration using a coarse-grained array, but the present invention is not limited thereto and may be applied to another type of reconfigurable architecture and another application specific architecture processor.

Figure 2:
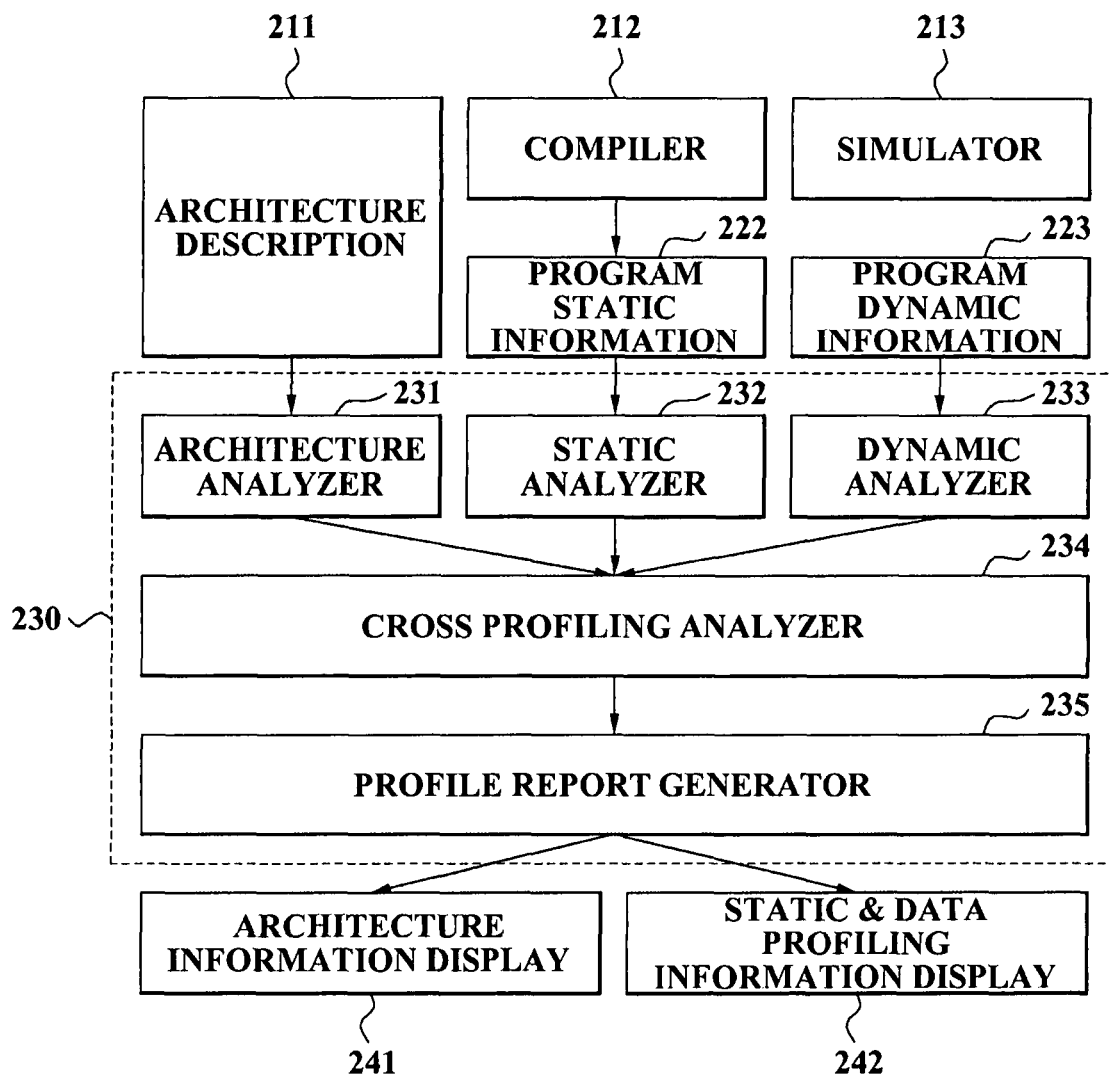
FIG. 2 is a block diagram illustrating a configuration of a profiler according to an exemplary embodiment of the present invention.

FIG. 2 is a block diagram illustrating a configuration of a profiler 230 according to an exemplary embodiment of the present invention.

The profiler 230 according to the present exemplary embodiment includes an architecture analyzer 231, a static analyzer 232, a dynamic analyzer 233, a cross profiling analyzer 234, and a profile report generator 235.

The architecture analyzer 231 analyzes an architecture description 211, and generates architecture analysis information. The architecture description 211 describes an architecture of an application specific architecture processor which includes a plurality of processing elements. The architecture analyzer 231 will be described later in detail with reference to FIGS. 3 through 6.

The static analyzer 232 analyzes program static information 222 that describes static information of a program, and generates static analysis information. In this instance, the program static information 222 may be generated into a format of an Extensible Markup Language (XML), and the like, by a user. Also, the program static information 222 may be generated by compiling a program via a compiler 212. The static analyzer 232 will be described later in detail with reference to FIGS. 7 through 11.

The dynamic analyzer 233 analyzes program dynamic information 223 that describes dynamic information of the program, and generates dynamic analysis information. In this instance, the dynamic information of the program is generated by simulating the program. The program dynamic information 223 corresponds to information generated when the program is substantially executed by simulating the program via a simulator 213. For example, when the program contains a conditional statement, the static analyzer 232 may not be able to determine what type of condition the program will be in, but the dynamic analyzer 233 may be able to determine what type of condition the program will be in. According to an exemplary embodiment of the present invention, the dynamic analyzer 233 may be embodied together with the cross profiling analyzer 234, which, in the present specification, will be described later in detail with reference to FIGS. 12 through 17B.

The cross profiling analyzer 234 generates information for optimizing the application specific architecture processor to implement the program based on at least one of the architecture analysis information, the static analysis information, and the dynamic analysis information.

Also, the profile report generator 235 visually depicts the information for optimizing the application specific architecture processor, which is generated by the cross profiling analyzer 234, and provides a user with the visually depicted information. For example, information for optimizing the application specific architecture processor may be provided for a user in formats as shown in FIGS. 14A through 17B. The user may determine an architecture of the application specific architecture processor based on the provided information, and apply the determined architecture to the application specific architecture processor, and thereby the user may determine the optimized application specific architecture processor to implement a corresponding program. Information generated by the profile report generator 235 may include an architecture information display 241, and a static and data profiling information display 242.

Figure 3:
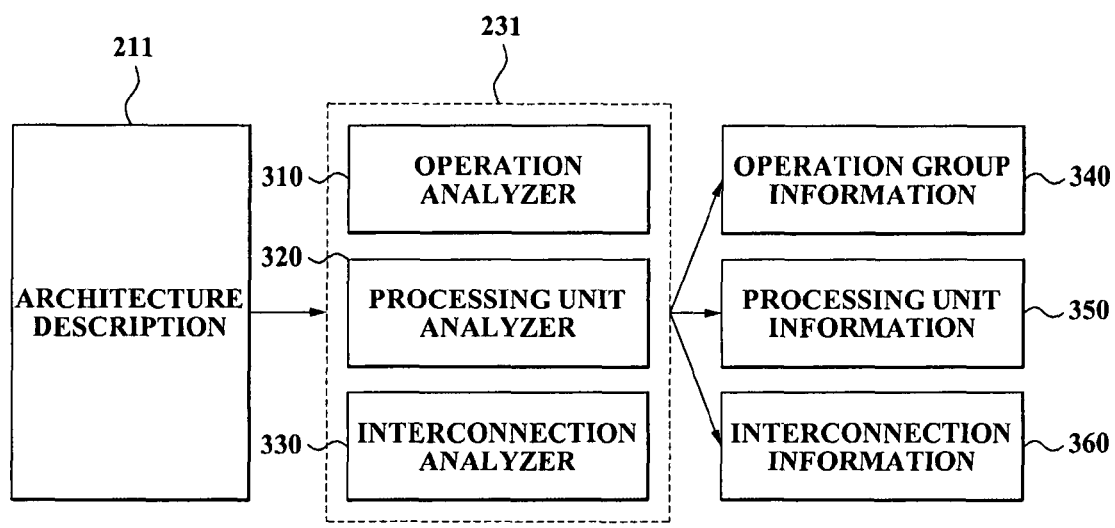
FIG. 3 is a block diagram illustrating an architecture analyzer of a profiler according to an exemplary embodiment of the present invention.

FIG. 3 is a block diagram illustrating an architecture analyzer of a profiler according to an exemplary embodiment of the present invention.

The architecture analyzer 231 corresponds to a module which analyzes an architecture of an application specific architecture processor. Therefore, the architecture analyzer 231 generates architecture analysis information by analyzing an architecture description 211.

In this instance, the architecture description 211 indicates data which describes the architecture of the application specific architecture processor including a plurality of processing elements. Also, the architecture description 211 may be described in an XML format, an Architecture Description Language (ADL) format, and the like.

FIGS. 4A and 4B illustrate an example of the architecture description 211 according to an exemplary embodiment of the present invention.

A first set of code lines 410 describes two input ports and an output port of a predetermined processing element which is identified by "fu_0" among a plurality of processing elements. Referring to the first set of code lines 410, the processing element "fu_0" includes two 32-bit input ports and a single 32-bit output port. A second set of code lines 420 describes operation groups supported by the processing element "fu_0". The processing element "fu_0" is configured to perform three operation groups which are identified by "arith", "logic", and "mul", respectively. In this instance, the processing element "fu_0" may be configured to perform a single operation group among the above three operation groups according to a configuration. When utilizing the profiler according to the present exemplary embodiment, information may be acquired regarding which operation group the processing element "fu_0" may be configured to perform.

A third set of code lines 430 describes information about connection of a processing element which is included in the application specific architecture processor. Referring to the third set of code lines 430, a port "dst1" of the processing element "fu_0" connects with a port "in1" of a central register file "vliw_int_rf".

Also, Fourth and fifth sets of code lines 440 and 450 describe information about operations which are included in each of the three operation groups. Referring to the fourth set of code lines 440, an operation group identified by "control" has a delay of "1" clock cycle, and also includes three operations, "mv2sr", "mvfsr", and "halt". In this instance, "mv2sr" indicates "move to special register", and "mvfsr" indicates "move from special register". Referring to the fifth set of code lines 450, an operation group identified by "arith" has a delay of "1" clock cycle, and also includes eight operations, "mov", "add", add_u", "sub", "sub_u", "setlo", "sethi", and "mb".

Referring again to FIG. 3, the architecture analyzer 231 includes an operation analyzer 310, a processing unit analyzer 320, and an interconnection analyzer 330. The architecture analyzer 231 analyzes the architecture description 211 via the operation analyzer 310, the processing unit analyzer 320, and the interconnection analyzer 330, and generates operation group information 340, processing unit information 350, and interconnection information 360.

The operation analyzer 310 analyzes the architecture description 211, and generates the operation group information 340 for a plurality of processing elements capable of performing a plurality of operation groups.

FIG. 6 illustrates an example of the operation group information 340 analyzed by the operation analyzer 310 according to an exemplary embodiment of the present invention.

As shown in FIG. 6, the operation group information 340 may include operations which are included in each operation group, a clock cycle, i.e. delay, which is required to perform the operation group, an identifier of each processing element capable of performing the operation group, a number of processing elements, and the like. For example, an operation group "arith" has a delay of "1" clock cycle, and includes eight operations, "mov", "add", "add_u", "sub", sub_u", "setlo", "sethi", and "mb". Also, the operation group "arith" is supported in a total of 16 processing elements from "fu_0" to "fu_15".

The processing unit analyzer 320 analyzes the architecture description 211, and generates at least one of information about an input port of each of the plurality of processing elements, information about an output port of each of the plurality of processing elements, and information about an operation group of each of the plurality of processing elements. Also, the processing unit analyzer 320 may generate information about a maximum delay of an operation group, which is supported by each of the plurality of processing elements.

FIG. 5 illustrates an example of the processing unit information 350 analyzed by the processing unit analyzer 320 according to an exemplary embodiment of the present invention.

The processing unit information 350 corresponds to information about a processing element which is identified by "fu_0" among a plurality of processing elements of an application specific architecture processor. First data 501 indicates a maximum delay of the processing element "fu_0" as "4" clock cycles. Specifically, an operation group, which has a largest delay among operation groups supported by the processing element "fu_0", has a delay "4" clock cycles. Second data 502 indicates a size occupied by the processing element "fu_0". Third data 503 indicates a number of bits required to configure the processing element "fu_0". In the present exemplary embodiment, the application specific architecture processor corresponds to a reconfigurable processor and thus configuration bits for configuring each of the plurality of processing elements are required. The third data 503 indicates the configuration bits. Fourth data 504 indicates information about input ports of the processing element "fu_0". Fifth data 505 indicates information about output ports of the processing element "fu_0". Sixth data 506 indicates information about operation groups supported by the processing element "fu_0".

Figure 16B:
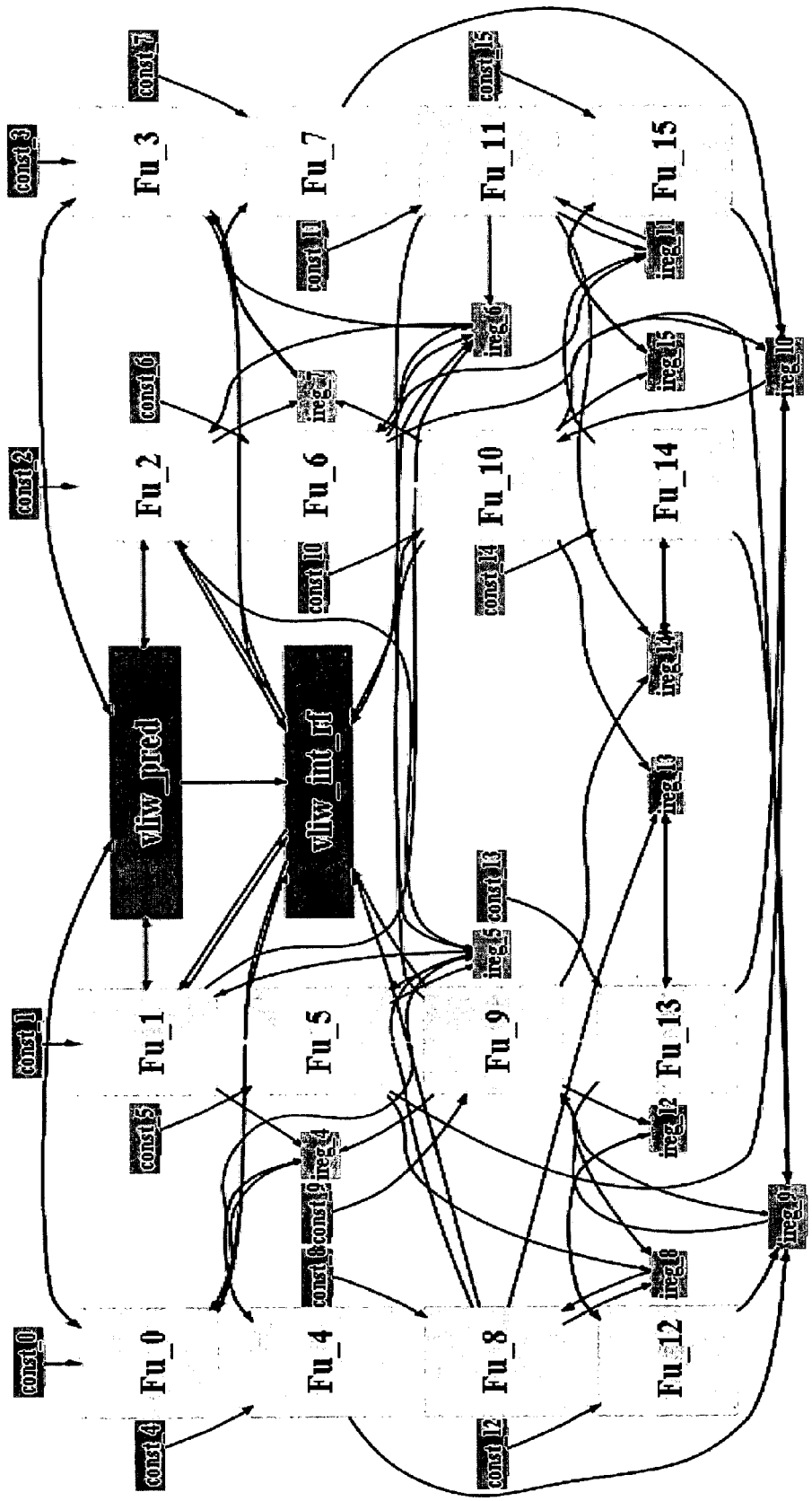
Figure 16C:
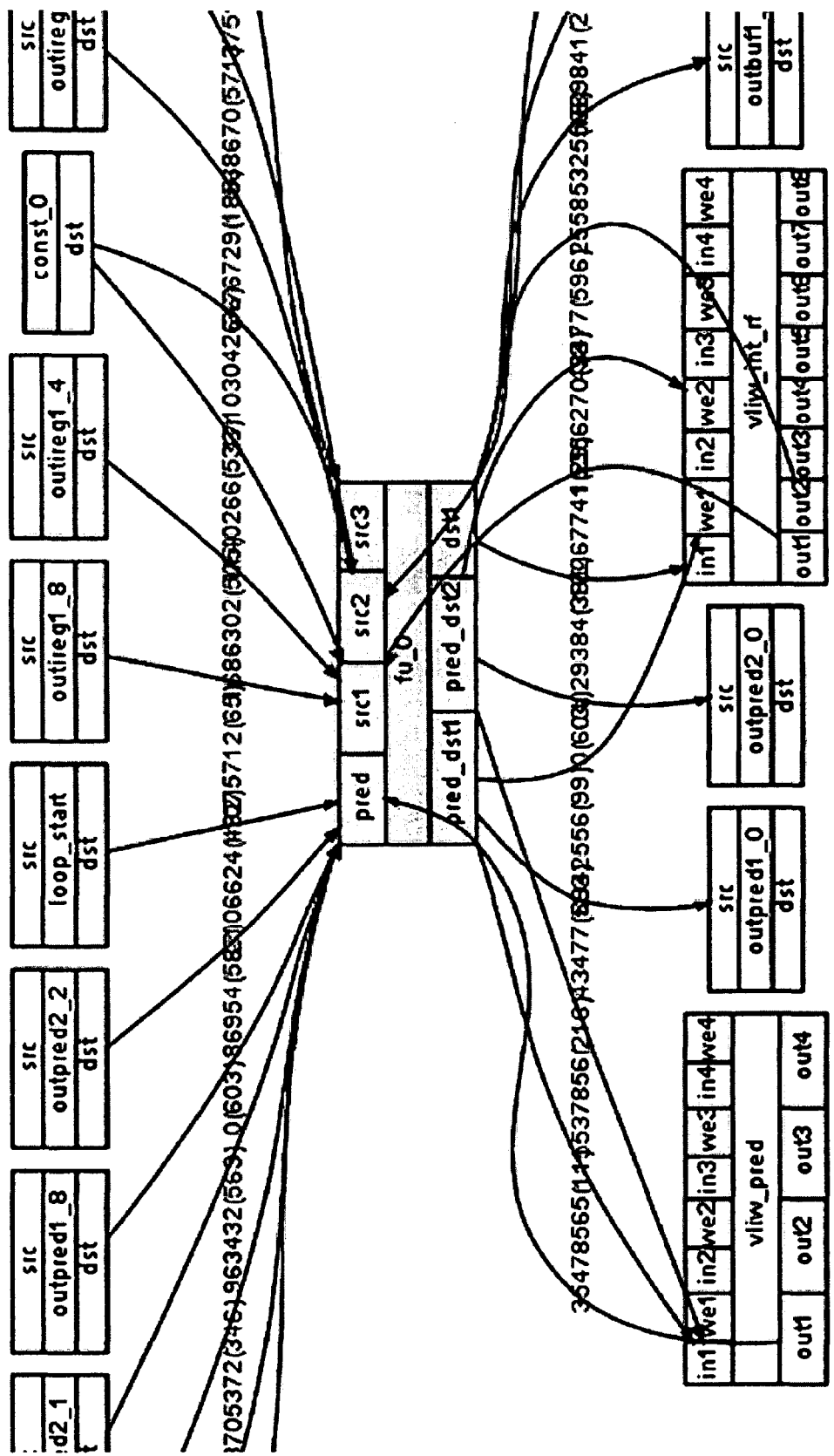

The interconnection analyzer 330 analyzes the architecture description 211 and generates the interconnection information 360 about interconnection of the plurality of processing elements of the application specific architecture processor. As shown in FIGS. 16B and 16C, the interconnection information 360 may be provided for a user by the profile report generator 235 in a readily visually recognizable format.

Figure 7:
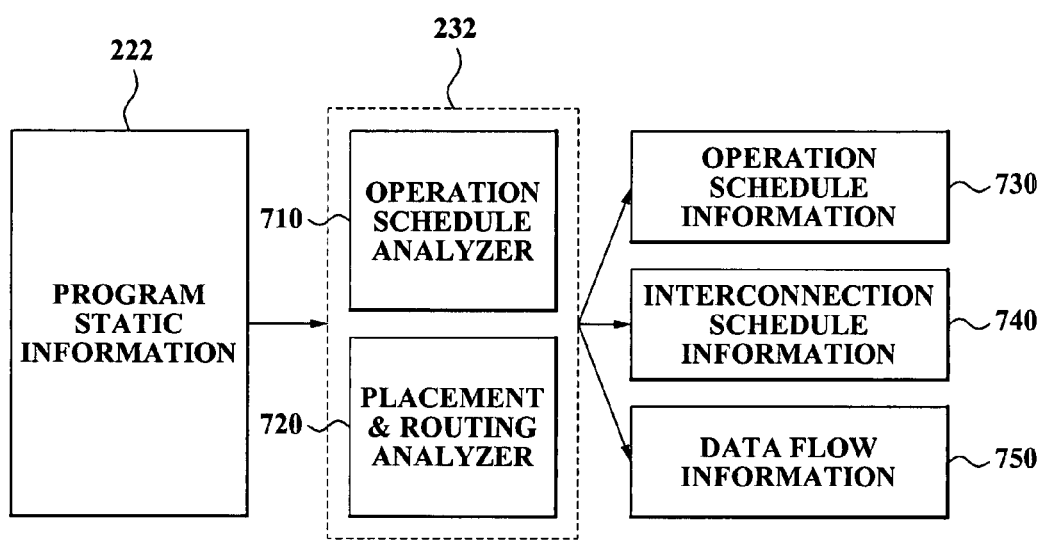
FIG. 7 is a block diagram for describing a static analyzer of a profiler according to an exemplary embodiment of the present invention.

FIG. 7 is a block diagram illustrating a static analyzer 232 of a profiler according to an exemplary embodiment of the present invention.

The static analyzer 232 generates static analysis information by analyzing the program static information 222 that describes static information of a program. In this instance, the program static information 222 may correspond to an assembly code which is generated by compiling a program.

FIG. 8 illustrates an example of the program static information 222. In FIG. 8, the program static information 222 is expressed in an XML format by compiling a program. Referring to FIG. 8, an operation with an identifier "403" performs an operation "add". In this instance, sources for the operation "add" includes a register file No. "48" and a register file No. "38" of the central register file 160 which is identified by "vliw_int_rf". The central register file 160 includes a plurality of register files. The results of the operation "add" are stored in a register file No. "24" of the central register file 160 which is identified by "vliw_int_rf". The program static information 222 is acquired from the program without simulating the program, and thus is different from the program dynamic information 223 which is generated by simulating the program.

Referring again to FIG. 7, the static analyzer 232 includes an operation schedule analyzer 710, and a placement and routing analyzer 720. The static analyzer 232 analyzes the program static information 222 via the operation schedule analyzer 710 and the placement and routing analyzer 720, and generates operation schedule information 730, interconnection schedule information 740, and data flow information 750.

The operation schedule analyzer 710 analyzes the program static information 222 and generates the operation schedule information 730 about a schedule of an operation, which is performed in each of the plurality of processing elements of the application specific architecture processor, for each cycle. Also, the operation schedule analyzer 710 may generate information about data dependency between operations, which are performed in each of the plurality of processing elements. The generated information is utilized as information for scheduling between a plurality of operations.

FIGS. 9 and 10 illustrate an example of the operation schedule information 730 generated by the operation schedule analyzer 710. The operation schedule information 730 shown in FIG. 9 indicates scheduling information of operation groups which are required to perform each of functions which perform a program. For example, a plurality of operation groups, "ARI", "SHI", "PRE", and the like, is required to perform a function "HalfDelVerNxGT8". Also, the operation groups must be performed in an order of ARI $7^{th}$, SHI $2^{nd}$, PRE $1^{st}$, and the like.

The operation schedule information 730 shown in FIG. 10 indicates scheduling information of an operation, which is performed in each of a plurality of processing elements, for each clock cycle. For example, in a clock cycle "0", a processing element "fu_0" performs an operation "ld_uc", and a processing element "fu_2" perform an operation "add".

Referring again to FIG. 7, the placement and routing analyzer 720 analyzes the program static information 222 and generates information about to which processing element, among the plurality of processing elements, each of a plurality of operations for performing the program is allocated. Also, the placement and routing analyzer 720 generates information about a number of times that each of the plurality of operations allocated to the processing element is performed in the processing element.

Also, the placement and routing analyzer 720 analyzes the program static information 222 and generates information about routing between the plurality of operations, allocated to the corresponding processing element, for each cycle. Also, the placement and routing analyzer 720 analyzes the program static information 222 and generates the data flow information 750 about data flows between the plurality of processing elements for each cycle.

FIG. 11 illustrates an example of the interconnection schedule information 740 and the data flow information 750 generated by the placement and routing analyzer 720 according to an exemplary embodiment of the present invention.

Referring to FIG. 11, in "0" clock cycle, a port "pred" of a processing element "fu_o" connects with a port "dst" of a device "loop_start" which constitutes the application specific architecture processor. Also, in the "0" clock cycle, a port "src2" of the processing element "fu_0" connects with a port "out2" of a device "vliw_int_rf" which constitutes the application specific architecture processor, and a port "src1" of the processing element "fu_0" connects with a port "out1" of the device "vliw_int_rf" which constitutes the application specific architecture processor.

Figure 12:
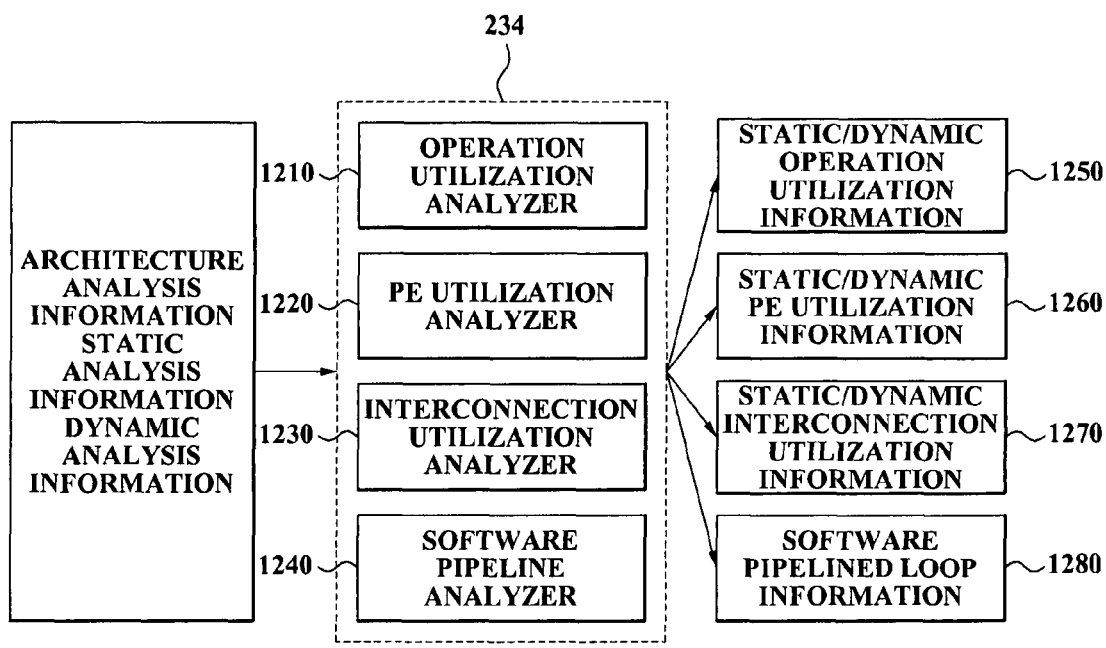
FIG. 12 is a block diagram for describing a dynamic analyzer of a profiler according to an exemplary embodiment of the present invention.

FIG. 12 is a block diagram for describing the dynamic analyzer 233 and the cross profiling analyzer 234 according to an exemplary embodiment of the present invention. In the present exemplary embodiment, the dynamic analyzer 233 is integrated into the cross profiler analyzer 234.

The dynamic analyzer 233 generates dynamic analysis information by analyzing the program dynamic information 223 that describes dynamic information of the program, which is generated by simulating the program. In this instance, the program dynamic information corresponds to information about when the program is substantially implemented by simulating the program via the simulator 213.

FIG. 13 illustrates an example of the program dynamic information 223. In FIG. 13, the program dynamic information 223 includes information about functions to implement a program, and this information is generated by simulating the program. Referring to FIG. 13, a function "HalfPelVerNxGT8_d" is called a total of "795" times while the program is being simulated. Also, other detailed information to perform the function is included.

Referring again to FIG. 12, the cross profiling analyzer 234 includes an operation utilization analyzer 1210, a processing element (PE) utilization analyzer 122, an interconnection utilization analyzer 1230, and a software pipeline analyzer 1240.

The cross profiling analyzer 234 generates information for optimizing the application specific architecture processor to implement the program based on at least one of the architecture analysis information, the static analysis information generated by the static analyzer 232, and the dynamic analysis information generated by the dynamic analyzer 233. The generated information includes static/dynamic operation utilization information 1250, static/dynamic PE utilization information 1260, static/dynamic interconnection utilization information 1270, and software pipelined loop information 1280.

The operation utilization analyzer 1210 generates static operation utilization information about a number of times that each of the plurality of operation groups is used for the program, based on at least one of the architecture analysis information, the static analysis information, and the dynamic analysis information. Also, the operation utilization analyzer 1210 generates dynamic operation utilization information about a number of times that each of the plurality of operation groups is used while the program is being simulated, based on at least one of the architecture analysis information, the static analysis information, and the dynamic analysis information.

Figures 14A, 14B:
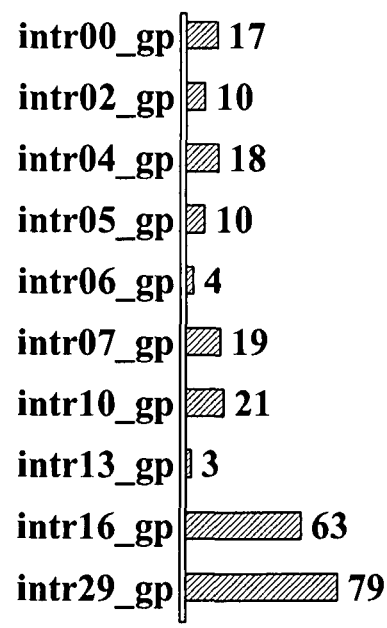
FIGS. 14A, 14B, and 14C illustrate static/dynamic operation utilization information generated by a profiler according to an exemplary embodiment of the present invention.
Figures 14C, 15A:
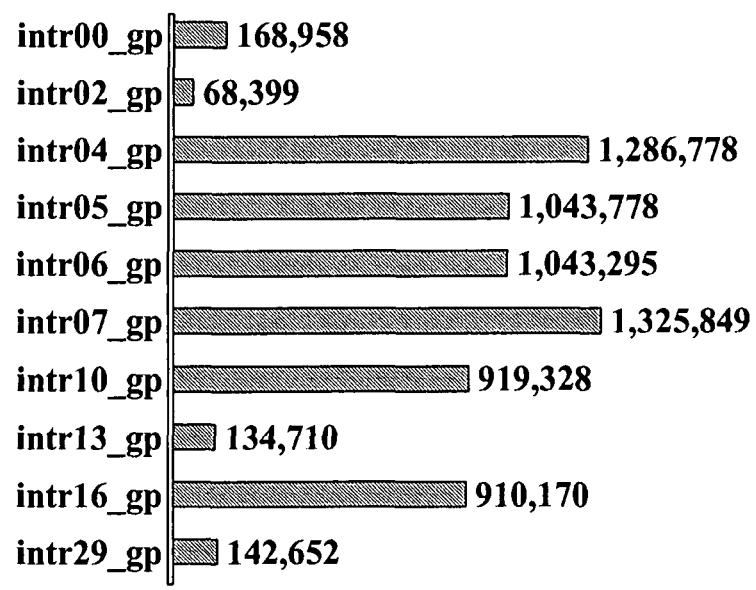
FIGS. 15A, 15B, and 15C illustrate static/dynamic PE utilization information generated by a profiler according to an exemplary embodiment of the present invention.

FIGS. 14A, 14B, and 14C illustrate static/dynamic operation utilization information generated by the operation utilization analyzer 1210.

As shown in FIG. 14A, program static information indicates that an operation group "extended" is called a total of 244 times, but program dynamic information indicates that the operation group "extended" is called a total of 7,043,917 times. In the program, although the operation group "extended" appeared only once, the operation group "extended" may be utilized many times using a loop, a recursive call, and the like. This is because, while the static analyzer 232 analyzes the program with only complied results, the dynamic analyzer 233 analyzes the program with the simulation results of the program.

FIG. 14B illustrates a number of times that each of a plurality of operation groups appeared in a program. Also, FIG. 14C illustrates a number of times that each of the plurality of operation groups is utilized while the program is being simulated.

In the present exemplary embodiment, static operation utilization and dynamic operation utilization with respect to operations "intr02_gp" and "intr13_gp" are decreased. In this case, a user may change the program with a function using another operation, eliminating the use of the operations "intr02_gp" and "intr13_gp". Also, a processor may change a processing element which supports the operations "intr02_gp" and "intr13_gp", so that the operations "intr02_gp" and "intr13_gp" are no longer supported. Also, in the present exemplary embodiment, an operation "intr06_gp" has low static operation utilization, but has high dynamic operation utilization. Therefore, it can be seen that the operation "intr06_gp" is required.

Referring again to FIG. 12, the PE utilization analyzer 1220 generates a number of processing elements, allocated to each of the plurality of operations groups, as static PE utilization information. Also, the PE utilization analyzer 1220 generates dynamic PE utilization information about a number of times that each of the plurality of operations allocated to the processing element is utilized in the processing element while the program is being simulated.

Figure 15B:
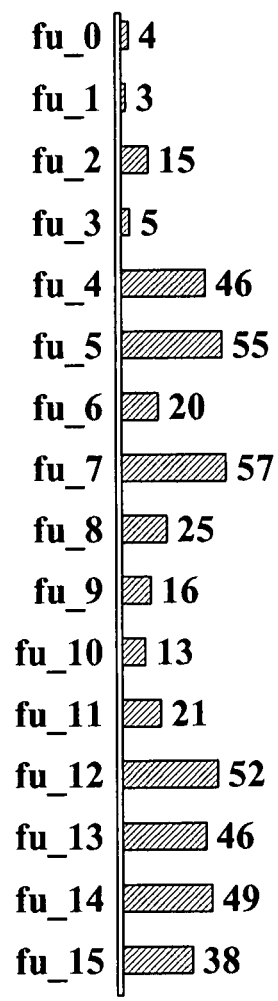
Figure 15C:
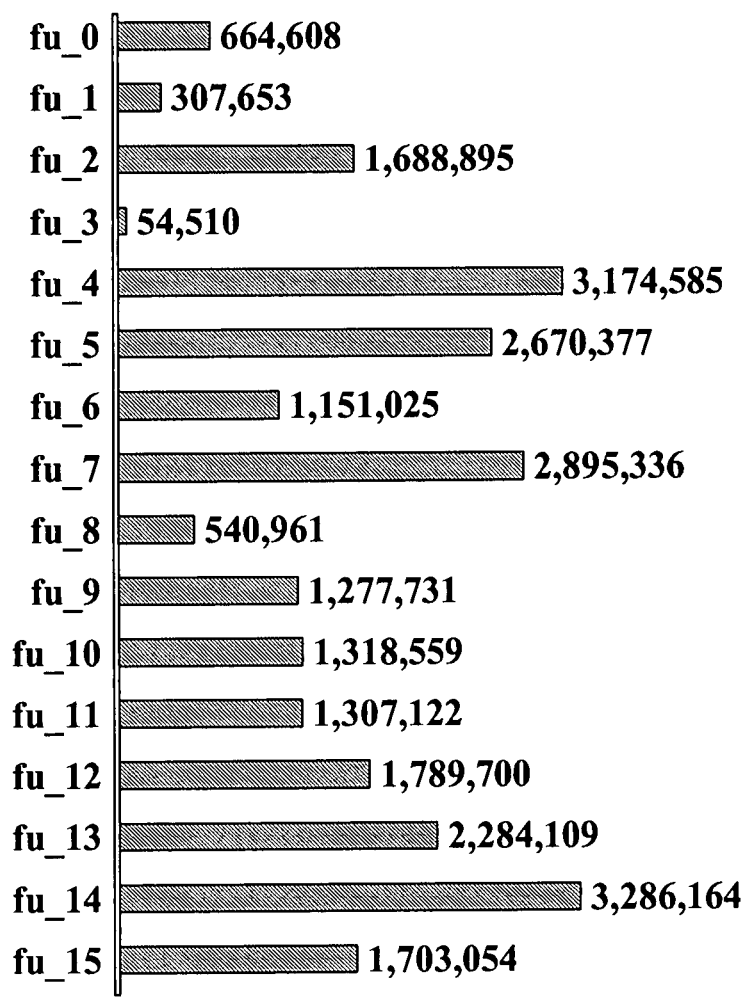

FIGS. 15A, 15B, and 15C illustrate the static/dynamic PE utilization information 1260 generated by the PE utilization analyzer 1220.

As shown in FIG. 15A, program static information indicates that an operation "extended" is performed in average 1.9 processing elements per cycle. Also, the program static information indicates that the operation "extended" is performed in a maximum of seven processing elements per cycle, and performed in a total number of 465 processing elements. When the operation group "extended" is performed in a single processing element for different cycles, it is doubly calculated. Also, when simulating the program, the operation group "extended" is performed in a total number of 26,114,389 processing elements. Like the static analysis, when a single processing element performs the operation group "extended" for different cycles while the program is being simulated, it is doubly calculated.

FIG. 15B illustrates a number of times that each of the processing elements is allocated to an operation group based on program static information. Also, FIG. 15C illustrates a number of times that the operation group is utilized in the allocated processing element while the program is being simulated. When only six processing elements, which support the operation group "extended", are available among the plurality of processing elements of the application specific architecture processor, six processing elements with a highest utilization may be selected with reference to FIGS. 15B and 15C, and the operation group "extended" may be written to the selected processing elements.

Referring again to FIG. 12, the interconnection utilization analyzer 1230 generates static interconnection utilization information about a number of times that interconnection of the plurality of processing elements is utilized based on the program static information 222. Also, the interconnection utilization analyzer 1230 generates dynamic interconnection utilization information about a number of times that the interconnection of the plurality of processing elements is utilized while the program is being simulated.

FIGS. 16A, 16B, and 16C illustrate static/dynamic interconnection utilization information and interconnection information generated by a profiler according to an exemplary embodiment of the present invention.

Referring to FIG. 16A, a processing element "fu_0", which is included in an application specific architecture processor, may have various types of interconnection. For example, while a port "pred" of the processing element "fu_0" utilizes 429 times of static interconnection with a port "out1" of "vliw_pred" of the application specific architecture processor, the port "pred" of the processing element "fu_0" utilizes 15,225,190 times of dynamic interconnection with the port "out1". Accordingly, referring to the static/dynamic interconnection utilization information 1270, the application specific architecture processor may be optimized by removing rarely utilized interconnection in each of the plurality of processing elements.

FIGS. 16B and 16C visually depict connection of each of a plurality of processing elements from different viewpoints, based on information acquired by analyzing the architecture description 211. A user may more readily recognize interconnection between the plurality of processing elements via visually depicted information.

Referring again to FIG. 12, the software pipeline analyzer 1240 generates software pipelined loop information 1280 about a loop, among loops of the program, which can be software pipelined. When the loop can be software pipelined, the software pipeline analyzer 1240 analyzes the loop and provides a user with the software pipelined loop information 1280. Therefore, the user may optimize the program according to the software pipelined loop information 1280.

FIGS. 17A and 17B illustrate software pipelined loop information generated by a profiler according to an exemplary embodiment of the present invention. In FIG. 17A, a degree of applicability of software pipelining with respect to each function is indicated by "s.cycle". In FIG. 17B, the software pipelined loop information is sorted in an order of "s.cycle", i.e. "cycle".

The profiler according to the above-described exemplary embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the exemplary embodiments of the present invention, there is provided a profiler which can provide required information to optimize a program in a target processor and also can provide required information to optimize the program and an application specific architecture processor by considering both the program and the application specific architecture processor.

Also, according to the exemplary embodiments of the present invention, there is provided a profiler which can provide static/dynamic operation utilization information, static/dynamic PE utilization information, static/dynamic operation schedule information of a program, and the like, which are required to optimize an application specific architecture processor.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A profiler comprising:
an application specific architecture processor which comprises a plurality of processing elements;
an architecture analyzer which generates architecture analysis information about an architecture of the application specific architecture processor;
a static analyzer which generates static analysis information about a program to be implemented by the application specific architecture processor;
a dynamic analyzer which generates dynamic analysis information about the program based on a result of simulating the program; and
a cross profiling analyzer which generates information for modifying at least one of the application specific architecture processor and the program based on at least one of the architecture analysis information, the static analysis information, and the dynamic analysis information,
wherein the cross profiling analyzer generates static interconnection utilization information about a number of times that interconnection of at least one port of the plurality of processing elements is used based on the generated static analysis information and dynamic interconnection utilization information about a number of times that interconnection of the at least one port of the plurality of processing elements is used while the program is being simulated, and uses the generated static utilization information and the generated dynamic utilization information for the modifying at least one of the application specific architecture processor and the program.

2. The profiler of claim 1, wherein the architecture analyzer comprises an operation analyzer which generates operation group information for at least one of the plurality of processing elements capable of performing at least one of a plurality of operation groups.

3. The profiler of claim 2, wherein the operation group information comprises a number of processing elements performing each of the at least one of the plurality of operation groups, among the plurality of processing elements, and an identifier of each of the at least one of the plurality of processing elements that is capable of performing each of the at least one of the plurality of operation groups.

4. The profiler of claim 1, wherein the architecture analyzer comprises a processing unit analyzer which generates at least one of input port information for at least one of the plurality of processing elements, output port information for the at least one of the plurality of processing elements, and information about at least one operation group for the at least one of the plurality of processing elements.

5. The profiler of claim 4, wherein the processing unit analyzer generates information about a maximum delay of an operation group among the at least one operation group, which is supported by the at least one of the plurality of processing elements.

6. The profiler of claim 1, wherein the architecture analyzer comprises an interconnection analyzer which generates information about interconnection of the plurality of processing elements.

7. The profiler of claim 1, wherein the static analysis information about the program is generated based on a result of compiling the program.

8. The profiler of claim 1, wherein the static analyzer comprises an operation schedule analyzer which generates scheduling information about at least one operation, which is performed in at least one of the plurality of processing elements, for each cycle.

9. The profiler of claim 8, wherein the operation schedule analyzer further generates scheduling information about at least one operation group which is required to perform at least one function which performs the program, wherein the at least one operation group comprises a plurality of operations.

10. The profiler of claim 8, wherein the operation schedule analyzer generates information about data dependency between the at least one operation.

11. The profiler of claim 1, wherein the static analyzer comprises a placement and routing analyzer which generates information about to which processing element, among the plurality of processing elements, at least one operation for performing the program is allocated.

12. The profiler of claim 11, wherein the placement and routing analyzer generates information about routing between the at least one operation allocated to a corresponding processing element, for each cycle.

13. The profiler of claim 11, wherein the placement and routing analyzer generates information about a number of times that the at least one operation allocated to the corresponding processing element is performed in the corresponding processing element.

14. The profiler of claim 1, wherein the cross profiling analyzer generates static operation utilization information about a number of times that at least one operation group is used for the program.

15. The profiler of claim 1, wherein the cross profiling analyzer generates dynamic operation utilization information about a number of times that at least one operation group is used while the program is being simulated.

16. The profiler of claim 1, wherein the cross profiling analyzer generates static processing element utilization information about a number of times that at least one of the plurality of processing elements is allocated to at least one operation group which is used for the program.

17. The profiler of claim 1, wherein the cross profiling analyzer generates dynamic processing element utilization information about a number of times that at least one operation group is used in at least one of the plurality of processing element allocated with the at least one operation group while the program is being simulated.

18. The profiler of claim 1, wherein the cross profiling analyzer generates information about a loop, among loops of the program, which can be software pipelined.

19. The profiler of claim 1, further comprising a profile report generator which visually depicts information for optimizing the application specific architecture processor, which is generated by the cross profiling analyzer, and provides the visually depicted information.

* * * * *